Nov. 25, 1969  G. F. COOPER  3,479,883
VERTICAL-TRACK FREE-FALL SYSTEM
Filed April 25, 1967  4 Sheets-Sheet 1
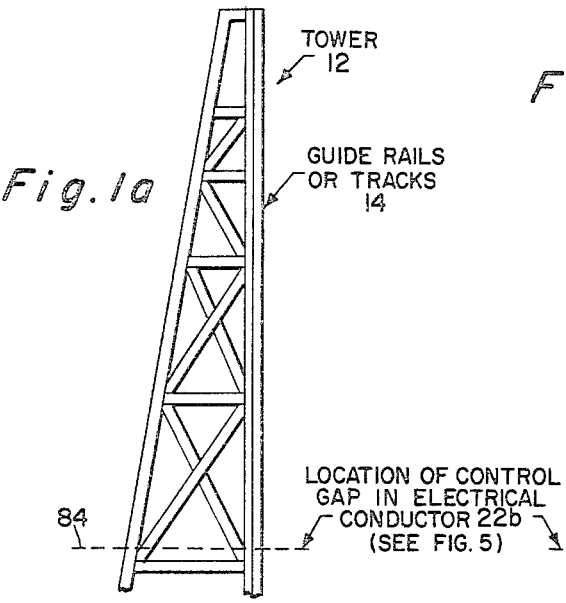
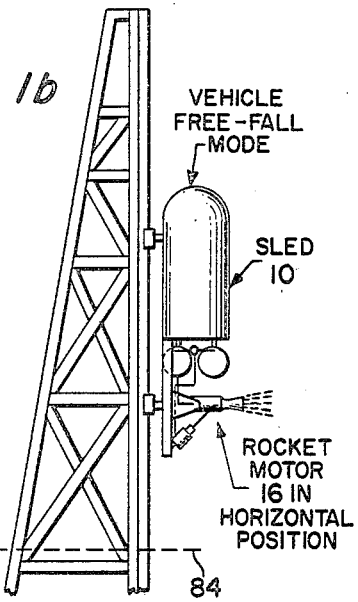
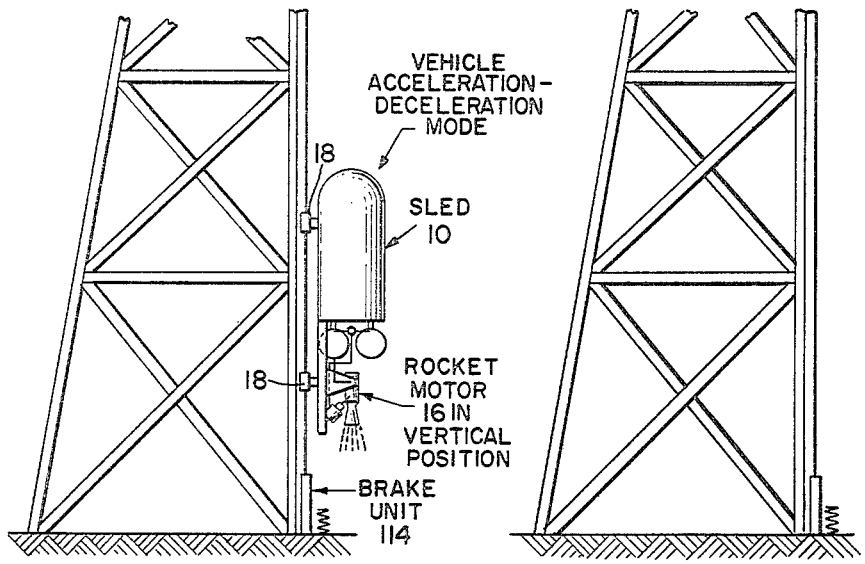
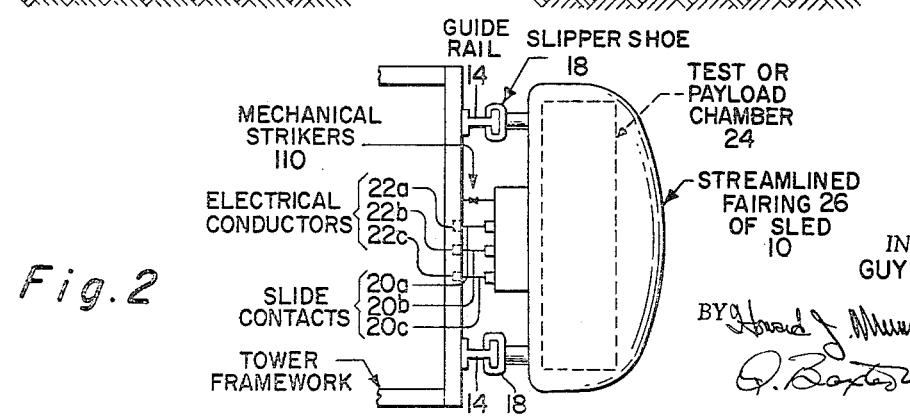
INVENTOR.
GUY F. COOPER

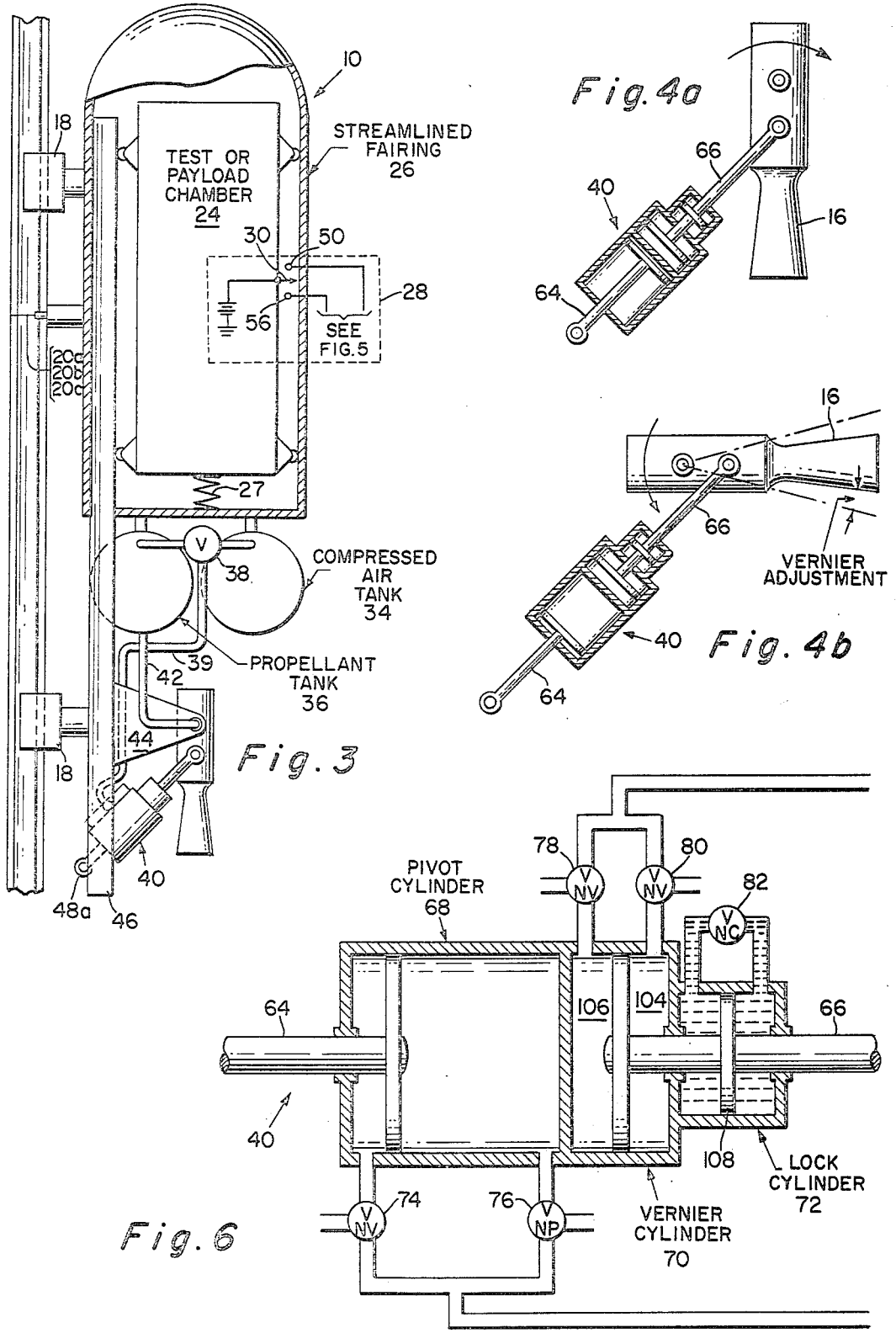

LIGHT PAYLOAD

HEAVY PAYLOAD

United States Patent Office 3,479,883
Patented Nov. 25, 1969

3,479,883
VERTICAL-TRACK FREE-FALL SYSTEM
Guy F. Cooper, 484 Rancho Drive,
Ventura, Calif. 93003
Filed Apr. 25, 1967, Ser. No. 634,803
Int. Cl. G01f 15/14; G01j 5/04; G01k 1/08
U.S. Cl. 73—432                9 Claims

ABSTRACT OF THE DISCLOSURE

A device for the placement of an object in free-fall, in which windage or friction drag are substantially eliminated. A sled, riding upon a pair of vertical rails, is accelerated and decelerated by a pivoted rocket motor. While in free-fall, the motor is swung into a horizontal position, thrusting the vehicle against its guide rails. A simple accelerometer-controlled servo system causes the motor to pivot slightly above or below the horizontal during free-fall, so that the vertical thrust vector cancels any drag, thus permitting a condition of free-fall to be achieved during ascent and descent.

---

The invention described herein may be manufactured and used by or for the Government of the United States of America for governmental purposes without the payment of any royalties thereon or therefor.

BACKGROUND OF THE INVENTION

The ability to place objects in free-fall, the so-called zero-gravity state, enables one to investigate phenomena in the absence of any external forces reacting against the body forces caused by the earth's gravitational field. Many processes, particularly those involving fluid mechanics and its applications to heat exchangers, boilers, and multi-phase thermodynamic processes that are taken for granted on the earth's surface behave quite differently when in a free-fall state. Mechanism such as passive satellite oscillation dampeners and orientation devices can also be investigated. These studies can include the effects of adding centrifugal and electromagnetic force fields to that of the earth's gravity to result in selective combinations of body forces. For example, free-fall tests may show that the presence of electrostatic fields would result in proper boiler and condenser functioning during free-fall.

Known methods of free-fall testing include drop towers, aircraft flown on ballistic trajectories, and rocket lofting into ballistic and orbital paths. However, drop towers do not eliminate air drag unless an evacuated tube is used for small specimens, and, in addition, only a one-way trip is possible. Aircraft require smooth air and computer-programmed auto pilots for satisfactory results, and furthermore cannot sustain precise fractional gravities. Ballistic lofting and orbiting of payloads allow long-term free-fall, and fractional gravities of acceleration can be provided in orbit by low-powered thrusters or centrifuge-like rotation. However, the cost of such equipment is high, particularly for sizeable payloads.

SUMMARY OF THE INVENTION

The present invention has as its principal objective the production of pure free-fall of a mass under minimum conditions of fluid and mechanical friction drag. In other words, acceleration of the mass is essentially unimpeded in the combined local gravitational and acceleration fields. Apparatus is provided for placing a mass in free-fall, isolating it from drag during the free-fall period, and making optimum use of the available distance for maximum free-fall testing time. By providing selective restraint of the test mass in the direction of free-fall, it can be subjected to precise fractional gravities of acceleration in addition to a perfect free-fall environment. Features of the concept include the provision of a free-fall testing tower system in which testing may be conducted during both ascent and descent of the tower by the test vehicle, thereby yielding approximately twice the testing time available from the conventional drop-tower method for a given tower height. Furthermore, a single constantly-burning rocket motor capable of being pivoted through approximately a 90° angle is employed for starting, stopping, and drag cancellation. In addition, by shielding the test mass so as to surround it in an envelope of stagnant air it is possible to essentially cancel fluid drag. This procedure is considered to be far preferable to the conventional expedient of having the mass fall within a vacuum.

One object of the present invention, therefore, is to provide an improved free-fall system which minimizes both fluid and mechanical drag.

Another object of the invention is to provide a vertical-track free-fall system yielding maximum free-fall time for a given track height.

A further object of the invention is to provide a free-fall system utilizing rocket thrust for the starting and stopping of a test vehicle as well as for the addition of fractional acceleration forces thereto.

Other objects, advantages, and novel features of the invention will become apparent from the following detailed description of the invention when considered in conjunction with the accompanying drawings wherein;

BRIEF DESCRIPTION OF THE DRAWING

FIGURES 1a and 1b are side views of a drop tower designed to support a rocket sled designed in accordance with the principles of the present invention, FIG. 1a illustrating the rocket sled in an ascending-descending impulse or thrust environment and FIG. 1b illustrating the same sled under free-fall conditions;

FIG. 2 is a top view of the rocket sled of FIGURES 1a and 1b, bringing out the manner in which it is supported by the vertical guide rails of the tower;

FIG. 3 is an enlarged view of the rocket sled of FIGS. 1 and 2 with the test chamber enclosure cut away to show the interior thereof;

FIGS. 4a and 4b illustrate the manner in which the rocket motor of FIG. 3 may be pivoted through an angle of approximately 90° from a vertical position as shown in FIGURE 1a to a substantially horizontal position as shown in FIG. 1b;

FIG. 6 is an enlarged view of the rocket motor pivoting unit of FIG. 5 showing the internal construction thereof;

DESCRIPTION OF THE PREFERRED EMBODIMENT

Figure 5:
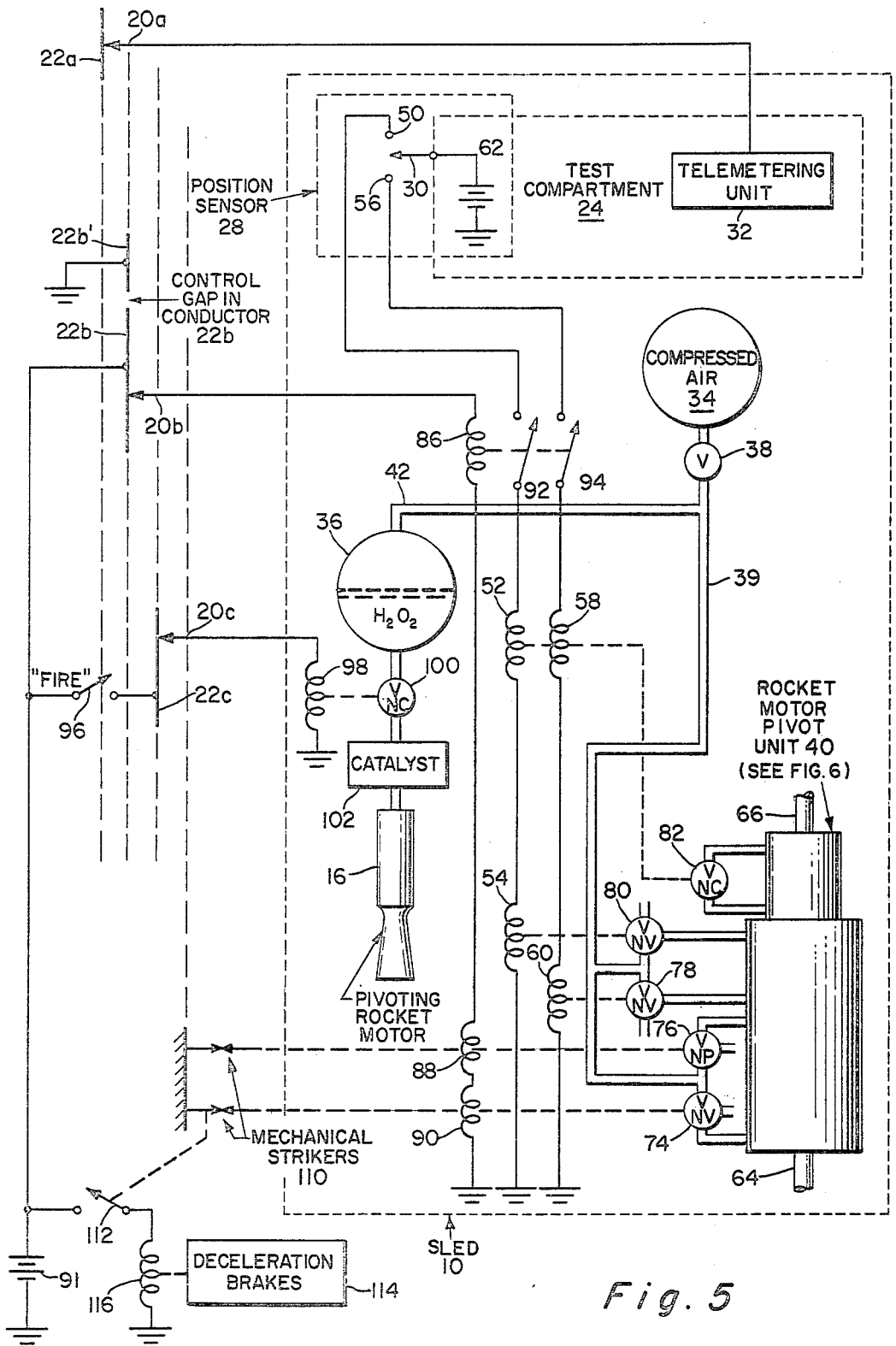
FIG. 5 is a largely schematic view of an electro-mechanical system for controlling the motion of the rocket sled of FIGS. 1, 2 and 3.

An important feature of the present concept resides in the provision of a free-fall rocket sled designed as illustrated in FIGURES 1, 2 and 3 of the drawings. Such a sled, identified generally by the reference numeral 10, is designed to be slidably associated with a drop tower 12 having as an integral part thereof a pair of spaced-apart vertical guide rails 14 (FIG. 2). These guide rails or tracks 14 slidably support the sled 10 so that the latter may undergo vertical movement along the rails to an extent limited only by the height of the drop tower 12. Although the latter is illustrated in FIGURE 1 of the drawings as comprising a self-supporting framework, it is contemplated that the rails 14 may alternatively be located along the face of a cliff or overhang in order that the sled 10 may undergo sufficient vertical motion to yield meaningful results from whatever equipment is being tested. Purely as an example, however, it may be assumed that the drop tower 12 of FIGURE 1 has a height of approximately 400 feet.

The present invention constitutes an improvement over a standard drop tower arrangement in that rocket power is employed to provide starting and stopping impulses for the vehicle, as well as to overcome drag. Furthermore, precise fractional gravity accelerations may be added to the payload during free fall. In order to accomplish this objective, the sled 10 includes a rocket motor 16 which is capable of being pivoted about an axis from a vertical position as shown in FIG. 1a to a substantially horizontal position as shown in FIG. 1b, or vice versa. When in the position of FIGURE 1a, the rocket motor 16 provides acceleration and deceleration forces to control the motion of sled 10, while in the position of FIG. 1b the rocket motor 16 adds no impulse whatsoever to the slid 10 other than that required for drag cancellation and when desired, that required for the addition of microgravities (if desired). To perform the above functions, the rocket motor 16 is capable of being pivoted through an angle of approximately 90°, as best shown in FIGURE 4 of the drawings. The means for effecting such operation will be described hereinafter. At the present point, it will merely be stated that the sled 10 rides along the rails or tracks 14 of the tower 12 through the medium of two pairs of slipper shoes 18, one of which pairs is shown in FIGURE 2 of the drawings. In order to regulate the movement of the sled 10, control energy is supplied thereto through a plurality of sliding electrical contacts 20a, 20b and 20c on the vehicle which maintain frictional engagement during ascent and descent of the slid 10 with a plurality of corresponding electrical conductors 22a, 22b and 22c embedded in, or carried by, the structural framework of the drop tower 12. However, this particular method of supplying electrical energy to and from the moving sled 10 forms no part of the present invention, and any suitable substitute may be employed if desired.

The major components of the rocket sled 10 of FIG. 1 and their basic relationship is shown in FIGURE 3 of the drawings. An inner test compartment or payload chamber 24 is enclosed within a streamlined fairing 26. Chamber 24 is restrained by a calibrated spring 27, and is capable of limited vertical displacement within the fairing 26. The calibrated spring 27 is present only when a particular fractional gravity of acceleration for the payload is desired; for zero gravity, no spring is used. Any vertical displacement of the test chamber is picked up by a position sensor 28 which comprises a microswitch actuatable from open to one of two closed positions, as shown in FIG. 5. The test chamber 24 may also include a telemetering unit 32 from which data indicative of the characteristics or functioning of any equipment located in the payload chamber 24 may be transmitted to a receiving point over the silde wire 20a and conductor 22a as again best shown in FIGURE 5 of the drawings, or by radio.

Carried by the rocket sled 10 is a tank 34 containing compressed air and a further tank 36 containing a suitable propellant, such, for example, as hydrogen peroxide. A valve 38 admits compressed air from tank 34 to a conduit 39 through which it flows to a rocket motor pivoting unit 40 capable of actuating the motor 16 through an angle of approximately 90°, as hereinabove mentioned. Valve 38 also controls the pressurization of the propellant in tank 36 to cause it the flow through a conduit 42 to enter the combustion chamber of the rocket motor 16. Additional elements interposed between tank 36 and the rocket motor 16 are shown in FIG. 5 but have been omitted from FIG. 3 in order to simplify this portion of the drawings. Such components will be described in conjunction with the description of the former figure.

The rocket motor 16 is pivotally supported on a pair of brackets 44 carried by the base member 46 of the rocket sled 10, such base member also supporting the streamlined fairing 26 as well as the tanks 34 and 36. One extremity of the rocket motor pivoting unit 40 is rotationally attached at 48a to the base member 46, as best shown in FIG. 3, while the other end of the unit 40 is rotationally attached at 48b to the outer shell of the rocket motor itself. Although the operation of this rocket motor pivoting unit 40 will be set forth in connection with a description of FIGURES 5 and 6, it should be recognized at the present point that such unit is effective to rotate the motor 16 through an angle of approximately 90° between a vertical position as shown in FIGURE 4a of the drawings and an essentially horizontal position as illustrated in FIGURE 4b. This is accomplished by the selective admission of compressed air from tank 34 to the unit 40, the complete construction details of which are shown in FIGURE 6. Consequently, this device has been illustrated in largely schematic fashion in FIGURE 4 of the drawings, which figure primarily serves to show the rocket motor positions obtained by selective pressurization of unit 40 during ascent and descent of the rocket sled 10 of FIGURE 1.

The electrical controls for that embodiment of applicant's invention herein described are set forth in FIGURE 5. However, the movement of the rocket sled of FIGURE 1 is dependent upon the operation of the rocket motor pivoting unit 40 of FIGS. 3 and 4, and knowledge of the construction of such unit is essential to an understanding of the concept. Accordingly, the assembly details of FIG. 6 are intended to be incorporated into the system of FIG. 5 and will be described as an essential part thereof.

It has been previously stated that the test compartment or payload chamber 24 of the rocket sled 10 includes the position sensor 28 which includes a conventional microswitch having a movable arm 30 which is actuatable in either an up or a down direction to indicate a vertical displacement of the test compartment relative to the body of the rocket sled. During the free-fall phase it is desired that signals from the position sensor 28 control the operation of the rocket motor pivoting unit 40 such that the vertical component of the thrust produced by the rocket motor 16 will bring the sled 10 back into a nominal position relative to the freely-falling test chamber 24. To accomplish this, the microswitch 30 has its upper terminal 50 (FIG. 5) electrically connected to ground through a pair of series-connected solenoids 52 and 54, while the lower terminal 56 of the microswitch 30 is similarly connected to ground through a second pair of series-connected solenoids 58 and 60. The movable contact of microswitch 30 is connected to the positive terminal of a source of potential 62, and it is desired that selective actuation of the switch arm into engagement with either contact 50 or 56 will energize either the solenoids 52 and 54, on one hand, or the solenoids 58 and 60, on the other.

Referring now to FIGURE 6 of the drawings, it will be noted that the unit 40 is made up of three individual contiguous cylinders arranged in-line along the common axis of two piston rods 64 and 66. These include a pivot cylinder 68 operated by a fluid such as compressed air, a vernier cylinder 70 also operated by similar fluid, and a lock cylinder 72 which may be completely filled with a relatively incompressible fluid such as oil. Movement of the piston rod 64 is controlled by selective admission of compressed air into the pivot cylinder 68 through operation of a pair of valves 74 and 76, while a vernier displacement of the piston rod 66 is brought about by selective admission of compressed air into the cylinder 70 by operation of a further pair of valves 78 and 80. The cylinder 72 is effective to lock the piston rod 66 in position at all times when a valve 82 is closed so that no movement of fluid can occur within the cylinder body. The operation of the various valves illustrated in FIGURE 6 will now be set forth in conjunction with a further description of the operation of the control system of FIG. 5.

As the rocket sled 10 of FIG. 1 ascends and descends the tower 12, there is a point or level at which a change is made to or from a free-fall condition. This level is indicated in FIGURE 1 of the drawings by a broken line and identified by the reference numeral 84. At this point or level 84, a gap is also formed in the vertical conductor 22b as shown in FIGURE 5, so that the slide wire 20b, when crossing this gap, has a change in potential impressed thereon. As best shown in FIGURE 5 of the drawings, this slide wire or movable contact 20b together with conductor 22b forms part of a closed circuit including three series-connected solenoids 86, 88 and 90 and a source of potential 91.

It will be appreciated that the rocket motor 16 prior to operation of the sled 10 is in an essentially vertical position as best shown in FIGURE 1a. Under such circumstances, the sled 10 is below the change level 84, and the slide wire or movable contact 20b is contacting the conductor 22b to establish a circuit through the solenoids 86, 88 and 90. As best shown in FIG. 5, the solenoid 86 controls the position of the two ganged switches 92 and 94, and these latter two switches are held in open position when the sled 10 is in the acceleration-deceleration mode. Obviously, in this mode no output from the position sensor 28 is necessary for controlling the relative positions of the sled body 10 and the payload chamber 24. Furthermore, under such conditions the valve 76 (which is controlled by the solenoid 88) is closed at the valve 74 (which is controlled by the solenoid 90) is open. This admits compressed air from the tank 34 through the open valve 38 and conduit 39 to the interior of the pivot cylinder 68 to actuate the piston 64 into the position shown in FIGURE 4a of the drawings. Under such conditions, the rocket motor 16 is essentially vertical, and the rocket sled 10 is in condition for ascent of the drop tower 12.

When it is now desired to fire the rocket motor 16, a remotely-located "fire" switch 96 is manually closed to supply energy over the conductor 22c and slide wire 20c through a solenoid 98. This opens a normally-closed valve 100 and admits the pressurized propellant (such as hydrogen peroxide) stored in the tank 36 to the combustion chamber of rocket motor 16 through a vessel 102 containing some suitable catalyst such, for example, as sodium permanganate. No ignition is necessary, since the sodium permanganate is capable of breaking the hydrogen peroxide down upon contact into steam and oxygen.

As the sled 10 ascends the drop tower 12 it reaches the level 84, as shown in FIG. 1, at which point the movable contact 20b crosses the gap formed in conductor 22b (see FIG. 5). The energy supply to the solenoids 86, 88 and 90 is thus terminated, since contact 20b is now in engagement with the grounded conductor portion 22b'. Consequently, solenoid 86 closes the switches 92 and 94, and at the same time the solenoid 88 opens the valve 76 while solenoid 90 closes the valve 74.

Closing of switch 92 establishes a current path for energy from the source of potential 62 through the solenoids 52 and 54 whenever the position sensor 28 causes the microswitch 30 to enter into an engagement with the upper contact 50. In the same manner, a downward movement of the microswitch arm into engagement with the lower contact 56 can now establish a current path through the series-connected solenoids 58 and 60 because switch 94 is closed simultaneously with switch 92. Since the sled 10 has now entered a "free-fall" mode, it is desired that the rocket motor 16 assume an essentially horizontal position as shown in FIGURE 1b of the drawings. This is brought about by entry of compressed air into the pivot cylinder 68 (FIG. 6) from tank 34 through the valve 76 which has now been opened by deenergization of the solenoid 88. Concurrently, the normally-vented valve 74 no longer receives compressed air from tank 34 by reason of the deenergization of solenoid 90, and consequently the piston 64 moves outwardly to an extended position as shown in FIGURE 4b of the drawings. A major portion of the thrust of the rocket motor 16 is now exerted against the rails or tracks 14, and neither adds to nor detracts from the vertical movement of the sled 10. However, to maintain the body of the rocket sled 10 at a velocity so that it maintains a desired spacing relative to the freely-falling payload chamber 24, a vernier adjustment of horizontal angle at the rocket motor 16 is desired, such that a small vertical component of thrust is developed. The manner in which this is accomplished will now be described.

Before discussing the vernier movement which may be imparted to the piston rod 66 by selective admission of compressed air into the vernier cylinder 70 of FIG. 6, it might be mentioned that the cylinder 72, which is associated with the valve 82, is filled with oil or other suitable fluid. This valve 82 is controlled by the two ganged solenoids 52 and 58, so that the valve 82 is open whenever a signal is being transmitted from the position sensor 28 by closing of the microswitch 30 in either of its positions. When the microswitch 30 is open, the valve 82 is closed to lock the piston rod 66 in position and preclude any movement thereof. However, when a signal is being transmitted by the position sensor through the closed microswitch 30, the valve 82 is open, and either solenoid 54 or solenoid 60 energized dependent upon whether the correction required is in an upward or downward direction. If it is desired to provide a vernier adjustment by rotating the rocket motor 16 through a limited angle in a clockwise direction (as brought out by FIGURE 4b) it is necessary that the piston rod 66 be retracted, and this is achieved by the opening of valve 80 to admit compressed air into the chamber 104 of FIG. 6 from the tank 34. On the other hand, should it be desired to extend the rod 66 so as to rotate the rocket motor 16 through a limited angle in a counter-clockwise direction (again as brought out in FIGURE 4b of the drawings) then air is admitted into the chamber 106 through valve 78. In all cases when both valves 80 and 78 are closed, indicating that no signal is being received from the position sensor 28, then the valve 82 is also closed by deenergization of the solenoids 52 and 58 so that the member 108 is precluded from movement in either axial direction and hence the piston rod 66 locked in the position which it had assumed after the last correctional signal was received.

As a supplemental backup to solenoids 88 and 90, a pair of mechanical strikers 110 may be placed at a proper position on the drop tower 12 to directly actuate the valves 74 and 76 as the sled passes the vicinity of the strikers. Otherwise, a greater impulse than is necessary to carry the sled to the top of the tower 12 will be developed in the event that due to some malfunction the solenoids 88 and 90 are not deenergized. Correspondingly, on the return, or downward, trip of the rocket sled 10, the valves 76 and 74 must be returned to a condition in which the piston rod 64 is withdrawn as shown in FIG. 4a so that the rocket motor 16 may assume a vertical position in order to apply deceleration thrust to the sled 10. This can be brought about, as above described, either by energization of the solenoids 88 and 90 or by action of the mechanical strikers 110. As a final safety factor, should the motor thrust or the gimbaling fail, the strikers 110 can be made to close a switch 112 and activate a braking unit 114 through energization of a solenoid 116. Normally, however, this should not be necessary, as the thrust of the rocket motor 16 is sufficient in most cases to impart sufficient deceleration to the sled 10 to bring it to a stop before the ground level is reached.

The vertical location of the strikers 110 on the drop tower 12, and also the location of the gap in the conductor 22b as shown in FIG. 5, are set where it is desired that the free-fall phase of operation should begin and end. This initiation and termination of free-fall should occur at approximately the same vertical level if loss in mass of the propellant consumed by rocket motor 16 is neglected.

It is intended that the valve 82 controlling the flow of oil between the two chambers of the lock cylinder 72 incorporate a conventional flow-limiting orifice in order to restrict the velocity of movement of the piston rod 66. This will prevent oscillation of motor angle (during the free-fall phase) due to rapid vertical displacements of the test compartment 24 relative to the body of the sled 10, which oscillation would otherwise occur in response to a series of signals developed by repeated opening and closing of the microswitch 30 by the position sensor 28. With proper adjustment of the blow limiting orifice in valve 82, as well as the vertical distance between the switch contacts 50 and 56 of the microswitch 30, a dynamically stable system will result. Obviously, however, the limit of travel of the piston rod 66 and the mass of the sled 10 are also factors which should be taken into account.

Figure 7A:
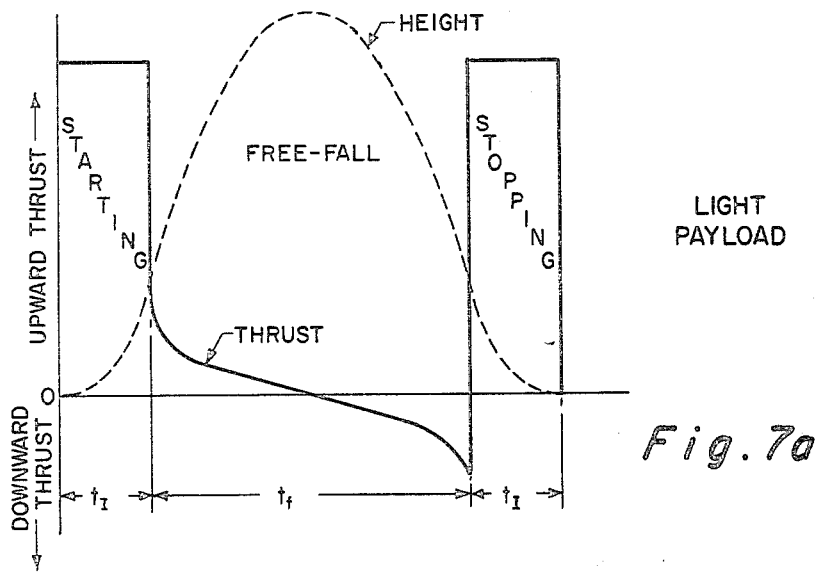
FIGS. 7a and 7b are graphs showing thrust and height curves for a free-fall vehicle having both a light and a heavy payload, respectively.
Figure 7B:
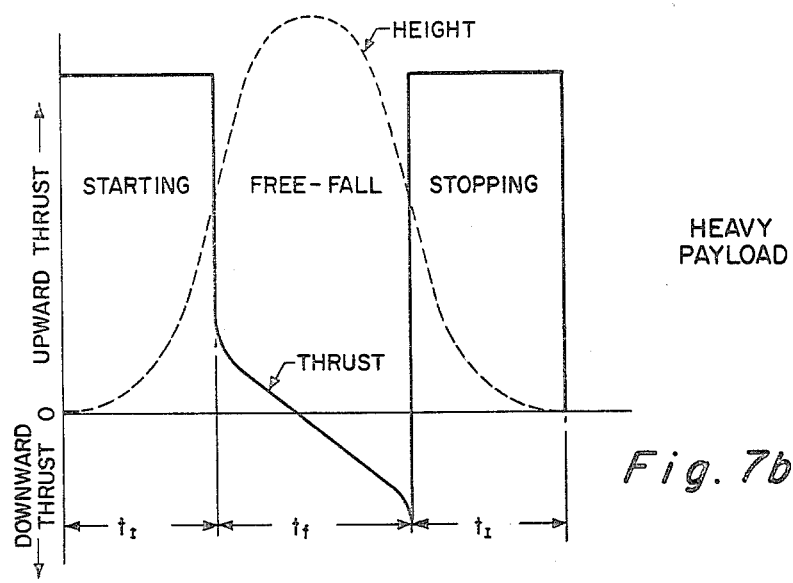

To fully comprehend the theoretical considerations involved in the operation of the device set forth in FIGURES 1 through 6 of the drawings, it will be helpful to make a number of permissible assumptions which in no way detract from the validity of the analysis. Basically, Galileo's equations for simple falling bodies are employed. Although this assumes negligible propellant mass loss during rocket motor burning, such loss of propellant mass does not affect the vehicle trajectory, so that the assumption is acceptable. Obviously, however, the stopping impulse required is less than the starting impulse due to this propellant mass loss. Moreover, unless the payload in chamber 24 is extremely heavy, the time devoted to impulse (that is, starting or stopping) is a small fraction of the total propellant burning time. This is brought out in FIGURE 7a of the drawings as applied to a vehicle with light payload and in FIG. 7b of the drawings as applied to a vehicle with considerably greater payload. It will be noted, especially in the case of a lightly loaded vehicle, that the free-fall time is appreciably longer than the period devoted to starting and stopping of the rocket sled. It should be recognized, however, that the difference between starting and stopping impulses becomes greater as the payload is decreased.

In the drawings and in the theoretical analysis of the system which follows below, the following definitions and symbols are employed:

$D$ = air drag on vehicle
$F$ = rocket motor thrust
$g$ = acceleration of gravity
$L = L_I + L_f$ = total height of tower or trajectory apogee
$L_I$ = distance along tower for starting and stopping impulses
$L_f$ = distance along tower used for free fall
$m_T = m_p + m_t + m_v$ = total mass at launch
$m_p$ = propellant mass
$m_t$ = mass of test specimen (payload)
$m_v$ = sled mass (minus propellants and test specimen)
NC = normally closed
NV = normaly vented to atmosphere
NP = normally pressurized
$t$ = time
$t_f$ = time duration of free fall
$t_T = 2t_I + t_f$ = total burning time of rocket motor
$t_I$ = impulse time
$x$ = distance
$\alpha = F/m_T g$ = thrust-to-weight ratio
$\beta = L_f/L$ = ratio of free-fall height to total tower height
$\theta$ = angle between thrust vector and horizontal
$\rho$ = density of air A body in a condition of free-fall satisfies the following equation:

$$x = \tfrac{1}{2}\ddot{x}t^2 \qquad (1)$$

Thus the rocket sled 10 of FIG. 1 covers the distance $L_f$ in one direction in time $t_f/2$ $$L_f = \tfrac{1}{2}g(t_f/2)^2 \qquad (2)$$

As can be seen by transposing in Equation 2, a one-way fall over the distance $4L_f$ would take $t_f$ time.

Assuming constant $m_p$, the acceleration experienced during the starting or stopping impulse is $(F - m_T g)/m_T$. Where the propellant mass $m_p$ is a relatively small fraction of the total vehicle mass, the errors resulting from this assumption are small. Therefore the time-distance relationship during impulse is $$L_I = \tfrac{1}{2}t_I^2(F - m_T g)/m_T \qquad (3)$$

Equating velocities at the transition from impulse to free fall, $$\ddot{x} = (t_f/2)g = t_I(F - m_T g)/m_T \qquad (4)$$

Solving for $t_f/2$ and substituting in (2), $$L_f = (g/2)(t_I/g)^2[(F - m_T g)/m_T]^2 \qquad (5)$$

Solving (3) for $t_I^2$ and substituting in (5), $$L_f = (F/m_T g - 1)L_I \qquad (6)$$

Since $L = L_I + L_f$, $$L = L_I(F/m_T g) = L_I \alpha \qquad (7)$$

From (6) and (7), $$L_f/L = (\alpha - 1)/\alpha = \beta \qquad (8)$$

where $\alpha = F/m_T g$.

Figure 8:
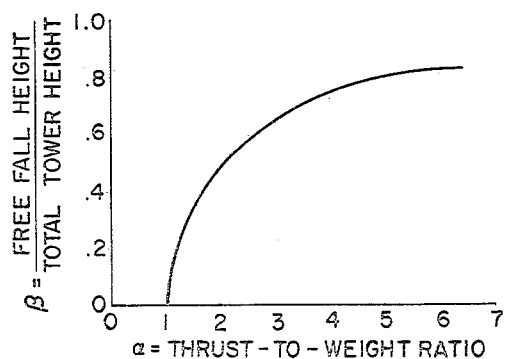
FIG. 8 is a graph showing that fraction of total tower height useful for free-fall as plotted against needed acceleration during impulse phase for the rocket sled of FIG. 1.

FIGURE 8 of the drawings is plotted from Equation 8 above, and represents the free-fall utilization of a tower height as the result of a given thrust-to-weight ratio of the rocket sled 10 of FIG. 1, again neglecting mass change due to any propellant losses. From Equation 2, the time of free-fall is $$t_f = (8L_f/g)^{1/2} \qquad (9)$$

and, from (3), the time duration of impulse is $$t_I = [2L_I m_T/(F - m_T g)]^{1/2} \qquad (10)$$

As an indication of the performance of a free-fall system designed in accordance with the teaching of the present disclosure, the following example may be of interest. In this example the tower height L is assumed to be 400 feet, the thrust F equal to 2,000 lb., the weight of the rocket sled 10 equal to 250 lb., and the specific impulse $I_{sp}$ of the rocket motor 16 equal to 200 seconds.

In this example, a nominal propellant weight of 150 lb. is chosen, since a rocket system with a specific impulse $I_{sp}$ of 200 seconds would, by definition, consume propellants at 10 lb./second to generate a thrust of 2,000 lb. Choosing a nominal burning time of 15 seconds for a 400-ft. tower results in 150 lb. of propellants. To determine more exactly the total propellant mass used, the total time of the run $t_T$ is found. From Equation 4, $t_f = (2/gm_T)(F - m_T g)t_I$. Substituting in $t_T = t_f + 2t_I$, $$t_T = (2F/m_T g)t_I \qquad (11)$$

Substituting for $t_I$ from Equation 10, $$t_T = (2F/m_T g)[2L_I m_T/(F - m_T g)]^{1/2} \qquad (12)$$

From (7), $L_I = Lm_T g/F$. Substituting this in Equation 12, $$t_T = [8LF/g(F - m_T g)]^{1/2} \qquad (13)$$

The total burning (or round-trip) time, $t_T$ from Equation 13, multiplied by the propellant mass flow rate gives approximately the total propellant mass needed. Substituting parameters for the 400-ft.-tower example given here, $$t_T = 446/(2000 - m_T g)^{1/2} \qquad (14)$$

The heavier the test weight, the more tower height is used for starting and stopping impulse, and the shorter the available free-fall time.

To determine the maximum gimbal angle needed during free fall to overcome drag, the maximum velocity was computed. Maximum velocity occurs at transition from impulse to free fall. Velocity and drag and the necessary rocket gimbal angle to counteract drag at various distances from the apogee can be readily derived.

If some suitable technique of rail slipper lubrication is employed, a friction coefficient $C_f$ of 0.02 may be chosen. Since the force normal to the rails during free fall is 2,000 lbs., a constant sliding friction force of 40 lb. results. Velocity at any distance from apogee can be expressed as $$V = (2gL_f)^{1/2} = 8.03(L_f)^{1/2} \qquad (15)$$

If we assume a drag coefficient $C_D$ of 1.05, a frontal area A of 9 ft.$^2$, and an air density $\rho$ of 0.0745 lbm./ft.$^3$, then wind drag D is $$D = \tfrac{1}{2}\rho V^2 C_D A = 0.0109 V^2 \qquad (16)$$

The angle with the horizontal which the motor must make to overcome the total drag force is $$\theta = \sin^{-1}[(D + \text{friction})/2000] \qquad (17)$$

To find the maximum control angle $\theta$ for a particular test weight, find the corresponding $L_f$, which then gives $\theta$. Except for perturbations, $\theta$ is always directed such that the vertical component of thrust is in the direction of motion of the sled since the drag is opposite.

If the same 250-lb. sled were placed on a 2,000-ft. length of vertical track on the face of a cliff with a 100-lb. test weight, the approximate maximum burning time would be 22.3 seconds according to Equation 9, where the free fall is 2,000 ft. The weight of propellants is therefore 223 lb. and the total weight $m_T g$ is 573 lb. From FIG. 8, $\alpha = 3.49$ (2,000-lb. thrust) and $\beta = 0.717$. From Equation 8, the useable portion of 2,000 ft., $L_f$, for free fall is 1,434 ft. From Equation 9, the duration of free fall would therefore be roughly 19 seconds.

To estimate the effect of errors in thrust duration and thrust magnitude on the trajectory apogee, an expression for L, as a function of rocket thrust and starting impulse time, is derived (still neglecting loss in propellant mass). Adding Equations 3 and 6, $$L = L_f + L_I = \tfrac{1}{2} t_I^2 (F^2/m_T^2 g - F/m_T) \qquad (18)$$

Taking the differential of L, $$dL = (\partial L/\partial F) dF + (\partial L/\partial t_I) dt_I$$

$$dL = t_I^2 \left( \frac{F}{m_T^2 g} - \frac{1}{2 m_T} \right) dF + t_I \left( \frac{F^2}{m_T^2 g} - \frac{F}{m_T} \right) dt_I \qquad (19)$$

Assuming incremental changes in F and $t_I$, the resultant incremental change in L is given approximately by $$\Delta L \cong t_I^2 \left( \frac{F}{m_T^2 g} - \frac{1}{2 m_T} \right) \Delta F + t_I \left( \frac{F^2}{m_T^2 g} - \frac{F}{m_T} \right) \Delta t_I \qquad (20)$$

Equation 20 emphasizes the importance of precise control of starting impulse.

With the continuously-firing single-engine system above described, high normal loads are applied to the tracks and structure holding them during the free-fall phase of operation. Therefore, the substitution of multiple-rocket motor arrangements in place of the one above described can be considered. For example, it is possible to utilize two solid rockets, or a double-firing liquid main engine for the acceleration and deceleration phases, while a small vernier motor is gimbaled to overcome drag forces during free-fall. This would eliminate the pivot unit 40 for rotating the main motor through an angle of approximately 90°.

Also, the total fuel consumption per run would be reduced, since the work to overcome drag is considerably less than that required to furnish starting and stopping impulses. In addition, normal track loads would be reduced. Still further, the lower noise and vibration from the smaller anti-drag vernier motor is desirable during free-fall operation. However, without the 90° pivoting capability, very precise control of main motor thrust and burning times would be required so that correct starting and stopping impulses can be applied to the rocket sled.

A further unique feature of the present concept resides in the ability to sustain very small accelerations accurately in the order of $10^{-3}$ to $10^{-4}$ $g$'s. It is for this type of testing that the calibrated spring 27 is used. This facilitates the testing of $g$-sensitive components associated with ion and plasma thrustors. Certain fluid-mechanic phenomena, such as liquid-gas interface geometries (which depend upon the interaction of cohesive, adhesive, and gravity forces) are still dominated by very small gravity forces. The required additional thrust is obtained through vernier cylinder control of the vertical component of the rocket thrust. Still further, the rocket sled of the present concept, being "on rails," is not subject to random air gusts and pilot errors that, in the case of aircraft, could apply accelerations to the test capsule far exceeding the desired steady-state level.

Obviously many modifications and variations of the present invention are possible in the light of the above teachings. It is therefore to be understood that the invention may be practiced otherwise than as specifically described.

What is claimed is:

1. In a system for creating a free-fall environment and thus facilitate the testing of articles under zero-gravity conditions, the combination of:
   a vertical track;
   a sled slidably supported by said track and adapted to ride therealong;
   a fairing securely attached to the body of said sled, said fairing having a chamber therewithin;
   a test receptacle within said fairing chamber and disposed for limited vertical movement in both directions with respect to said fairing;
   a rocket motor carried by said sled and adapted when fired to generate thrust effective to control the vertical movement of said sled selectively in both upward and downward directions and thus cause said sled to respectively enter and leave a free-fall environment; and
   means responsive to the relative position of said test receptacle and the fairing chamber within which said receptacle is enclosed for controlling the amount of vertical thrust developed by said rocket motor while said sled is in a free-fall environment.

2. A system according to claim 1, in which said rocket motor is pivotally mounted on said sled, further comprising means for rotating said motor through an angle of approximately 90° to and from a vertical position.

3. A system according to claim 2 in which the means for producing rotation of said rocket motor includes a selectively pressurizable multi-cylinder assembly interconnecting said motor and the body of said sled, one cylinder of said assembly including a piston rod extendable when said one cylinder is pressurized to bring said motor into an essentially horizontal position during the time that said sled is in a free-fall environment.

4. A system according to claim 3, in which a further cylinder of said multi-cylinder assembly is selectively pressurizable when said rocket motor is in an essentially horizontal position to effect a vernier adjustment of said motor through a limited angle in either direction to and from said essentially horizontal position when said sled is in a free-fall environment, and thus enable said motor to develop a vertical component of thrust effective to selectively add to and subtract from the velocity of said sled as it rides along said track.

5. A system according to claim 4, further comprising a plurality of elongated electrical conductors rigidly positioned in parallel relationship to said track, and a plurality of electrical contacts, equal in number to said conductors, carried by said sled and arranged to maintain respective electrical engagement with said conductors as said sled rides along said track, said conductors providing electrical contact between the ground equipment and the equipment on said sled.

6. A system according to claim 5, further comprising means for controlling the selective pressurization of the individual cylinders of said multi-cylinder assembly, said last-mentioned means comprising a source of pressurized fluid carried by said sled, and a plurality of solenoid-actuated valves individually operable by selective electrical energization of said solenoids to admit pressurized fluid from said source to a selected one of said individual cylinders to control the rotational status of said rocket motor.

7. A system according to claim 6, in which the means for producing selective electrical energization of said solenoids comprises an electrical circuit including a switch forming part of said means responsive to the relative position of said test receptacle and the fairing chamber within which said receptacle is enclosed.

8. A system according to claim 7, in which the initiation and termination of firing of said rocket motor is effected by means which includes an electrical circuit comprising a source of control potential, one of said elongated electrical conductors, and one of the electrical contacts carried by said sled.

9. A system according to claim 1, further comprising a calibrated spring disposed between said test receptacle and the inner surface of said fairing chamber and effective to impose micro-gravitational forces on said test receptacle during the period that said sled is in a free-fall environment.

References Cited

UNITED STATES PATENTS

| | | | |
|---|---|---|---|
| 2,724,966 | 11/1955 | Northrop et al. | 73—147 |
| 3,014,360 | 12/1961 | Herrmann | 73—12 |
| 3,196,690 | 7/1965 | Brooks | 73—432 |
| 3,339,418 | 9/1967 | Paynter et al. | 73—432 |

OTHER REFERENCES

Zero-G Devices and Weightlessness Simulators (NAS-NRC) by Siegfried J. Gerathewohl (pp. 28–34).

LOUIS R. PRINCE, Primary Examiner

H. C. POST III, Assistant Examiner

U.S. Cl. X.R.

73—117.1